United States Patent [19]

Erhart

[11] Patent Number: 4,872,489

[45] Date of Patent: Oct. 10, 1989

[54] PROCESS OF PROVIDING IN A LIQUID-CONTAINING LIQUID FRICTION COUPLING AN AIR-FILLED SPACE HAVING A PREDETERMINED VOLUME

[75] Inventor: Erich Erhart, Graz St. Peter, Austria

[73] Assignee: Steyr-Daimler-Puch AG, Vienna, Austria

[21] Appl. No.: 187,487

[22] Filed: Apr. 28, 1988

[30] Foreign Application Priority Data

Apr. 29, 1987 [AT] Austria ................................. 1070/87

[51] Int. Cl.[4] .......................... B67C 3/00; G01F 17/00
[52] U.S. Cl. .......................................... 141/5; 141/95; 73/149; 222/64
[58] Field of Search ...................... 141/1, 38, 98, 95, 5, 141/6, 51, 39–41; 222/1, 64; 116/268, 269; 73/149, 302

[56] References Cited

U.S. PATENT DOCUMENTS

| | | | |
|---|---|---|---|
| 3,895,519 | 7/1975 | Bouchy et al. ......................... | 73/149 |
| 4,562,874 | 1/1986 | Scheller ................................. | 141/95 |
| 4,763,518 | 8/1988 | Daviaud et al. ....................... | 73/149 |

FOREIGN PATENT DOCUMENTS

| | | | |
|---|---|---|---|
| 0028807 | 5/1981 | European Pat. Off. .............. | 73/302 |
| 0165493 | 12/1985 | European Pat. Off. . | |
| 1250648 | 9/1967 | Fed. Rep. of Germany . | |
| 1573056 | 3/1971 | Fed. Rep. of Germany . | |
| 2565000 | 11/1985 | France . | |
| 8002196 | 10/1980 | PCT Int'l Appl. ................... | 73/149 |
| 296037 | 4/1954 | Switzerland . | |

OTHER PUBLICATIONS

Machine Design, vols. 6 and 26, Published Mar. 17, 1960, and Dec. 22, 1960, pp. 12 and 108.

Primary Examiner—Henry J. Recla
Assistant Examiner—J. Casimer Jacyna
Attorney, Agent, or Firm—Marmorek, Guttman & Rubenstein

[57] ABSTRACT

In order to provide in a liquid-containing liquid friction coupling an air-filled space having a predetermined volume in a process which requires a minimum of manipulation and can be carried out in a short time, equal quantities of air are forced into the liquid-containing liquid friction coupling, on the one hand, and into a pressure-tight reference vessel which contains an air-filled space having the desired volume, on the other hand, the pressure difference between the reference vessel and the liquid friction coupling is then measured, and the pressures are balanced in that liquid is added to or removed from the liquid friction coupling.

1 Claim, 1 Drawing Sheet

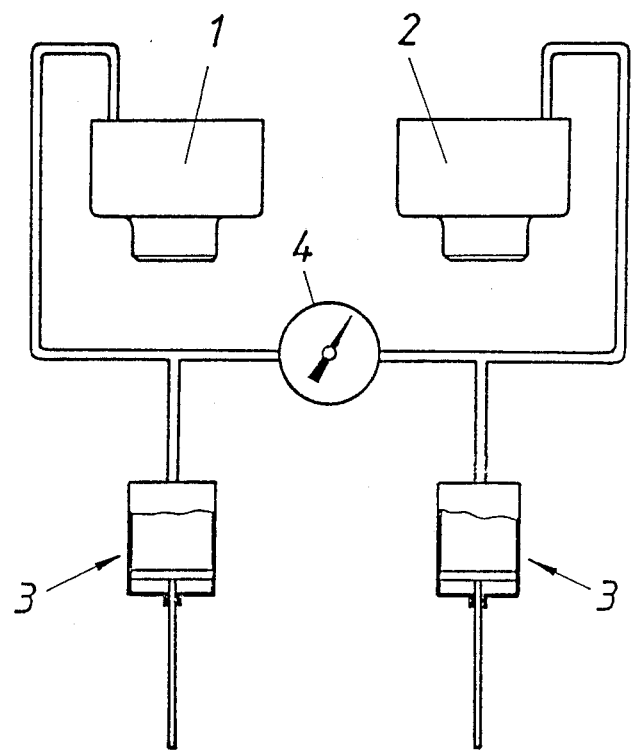

PROCESS OF PROVIDING IN A LIQUID-CONTAINING LIQUID FRICTION COUPLING AN AIR-FILLED SPACE HAVING A PREDETERMINED VOLUME

BACKGROUND OF THE INVENTION

1. Field of the Invention

This invention relates to a process of providing in a liquid-containing liquid friction coupling an air-filled space having a predetermined volume.

2. Description of the Prior Art

Mass-produced liquid friction couplings of a given series are desired to have the same characteristics regarding the dependence of the transmitted torque on the speed difference. But the family of characteristic curves of a given coupling will primarily depend on the volume of the air-filled space in the liquid friction coupling and owing to the inevitable manufacturing tolerances the volume of that air-filled space differs from coupling to coupling so that different couplings of a series usually have different characteristic curves.

It is known in practice to record the characteristics of each coupling of a series while the coupling is installed on a test stand and to compare the recorded characteristic curves with the desired curves. In dependence on the result of that comparison, liquid is then removed from or added to the coupling until another test reveals that the family of characteristic curves closely match the desired curves. That procedure requires complicated and timeconsuming manipulations, particularly because it is often necessary to operate the coupling on the test stand repeatedly and because the coupling must be cooled after each test operation.

SUMMARY OF THE INVENTION

For this reason it is an object of the invention to provide a process by which the volume of the air-filled space of liquid friction couplings of the same series can be adjusted to a predetermined value within a shorter time and in a simpler operation.

That object is accomplished in accordance with the invention in that equal quantities of air are forced into the liquid-containing liquid friction coupling, on the one hand, and into a pressure-tight reference vessel which contains an air-filled space having the desired volume, on the other hand, the pressure difference between the reference vessel and the liquid friction coupling is then measured, and the pressures are balanced in that liquid is added to or removed from the liquid friction coupling.

Because equal quantities of air are forced into the liquid friction coupling and into the reference vessel, there will be no pressure difference between said volumes to be compared unless the volumes differ from each other. In that case the volume of the air-filled space in the liquid friction coupling can be changed by an addition or removal of liquid until the detection of a pressure balance reveals that the air-filled space in the liquid friction coupling has the predetermined volume. the reference vessel may consist of a liquid friction coupling which has inherently the desired family of characteristic curves. The air which is forced into the liquid friction coupling which is to be adjusted to have the desired family of characteristic curves must be under such a high pressure that the internal pressure of the air-filled voids contained in the viscous liquid equals the air pressure in the space outside the liquid.

BRIEF DESCRIPTION OF THE DRAWING

FIG. 1 is a diagrammatic representation of an apparatus which can be used to carry out the process in accordance with the invention.

DETAILED DESCRIPTION OF THE PREFERRED EMBODIMENT

A preferred embodiment of the process in accordance with the invention will now be described with reference to the drawing.

A pressure-tight reference vessel 1 is provided, which may consist of a liquid friction coupling which has the desired family of characteristic curves. A liquid friction coupling 2 is to be filled with such an amount of viscous liquid that the air-filled space remaining in the coupling 2 equals the volume of the air-filled space in the reference vessel 1 because the family of characteristic curves will mainly depend on the volume of that air-filled space.

Two identical cylinder-piston units 3 are operated to force equal quantities of air into the reference vessel 1 and into the liquid friction coupling 2 and the pressure difference between the reference vessel 1 and the liquid friction coupling 2 is subsequently read from the instrument 4. Liquid is then added to or removed from the liquid friction coupling 2 until the instrument 4 indicates a zero pressure difference, i.e., a pressure balance. This means that the air-filled spaces in the liquid friction coupling 2 and in the reference vessel 1 have the same volume.

I claim:

1. A process of providing in a liquid-containing liquid friction coupling an air-filled space having a predetermined volume, comprising the steps of
   providing an air-tight reference vessel containing an air-filled space having said predetermined volume,
   forcing equal quantities of air into said reference vessel and into said liquid-containing liquid friction coupling,
   comparing the pressures in said reference vessel and in said liquid friction coupling by means of a differential pressure indicator connected between said reference vessel and said liquid friction coupling, and
   adding or removing liquid in said liquid friction coupling if there is a difference between said pressures until said differential pressure indicator shows that said difference is reduced to zero.

* * * * *